C. H. KNAPP.
COMBINED HAY RAKE AND ELEVATOR.
APPLICATION FILED JAN. 6, 1908.
900,287.
Patented Oct. 6, 1908
3 SHEETS—SHEET 1.
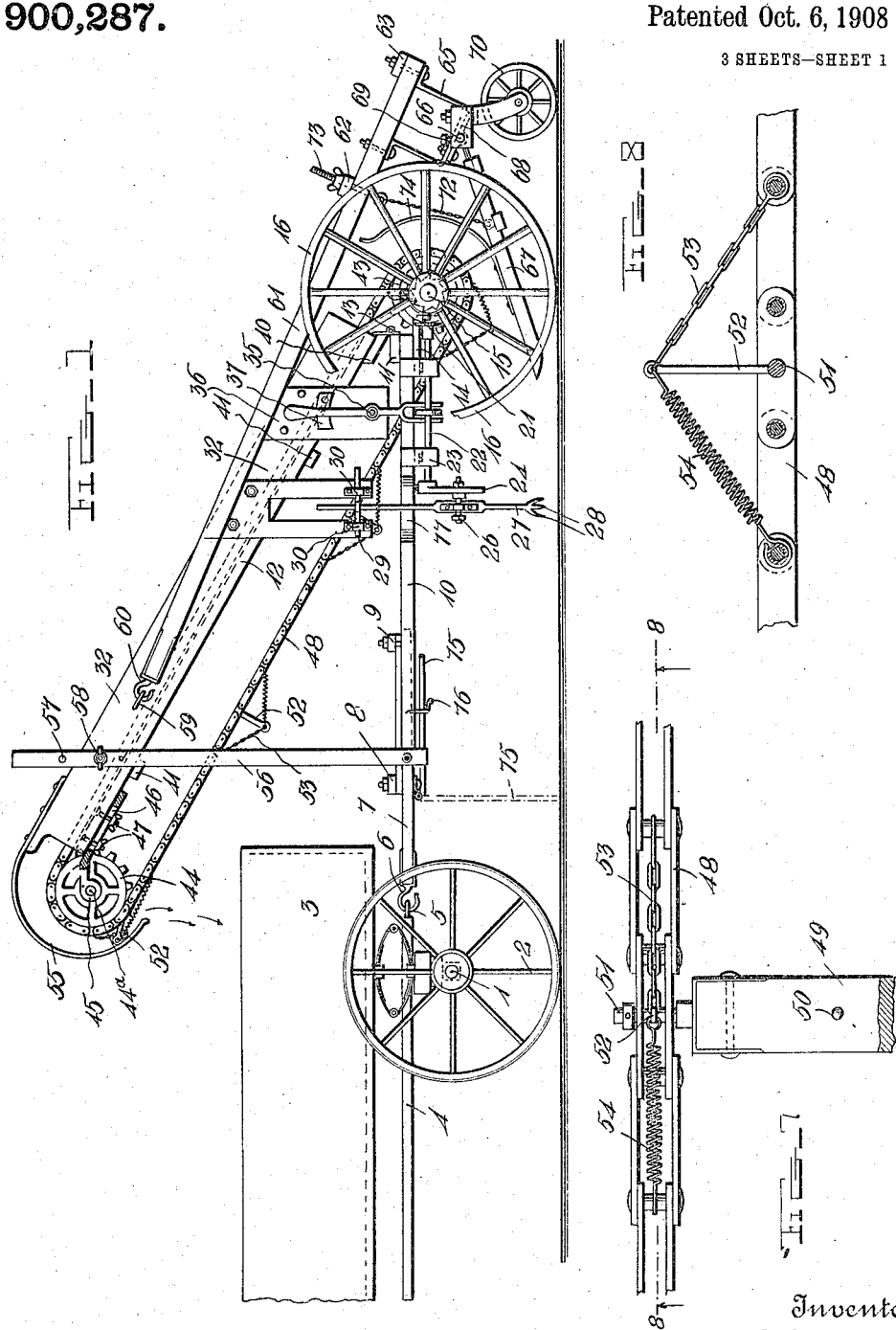
Witnesses
C. H. Griesbauer
Inventor
Charles H. Knapp
By H. B. Willson & Co.
Attorneys

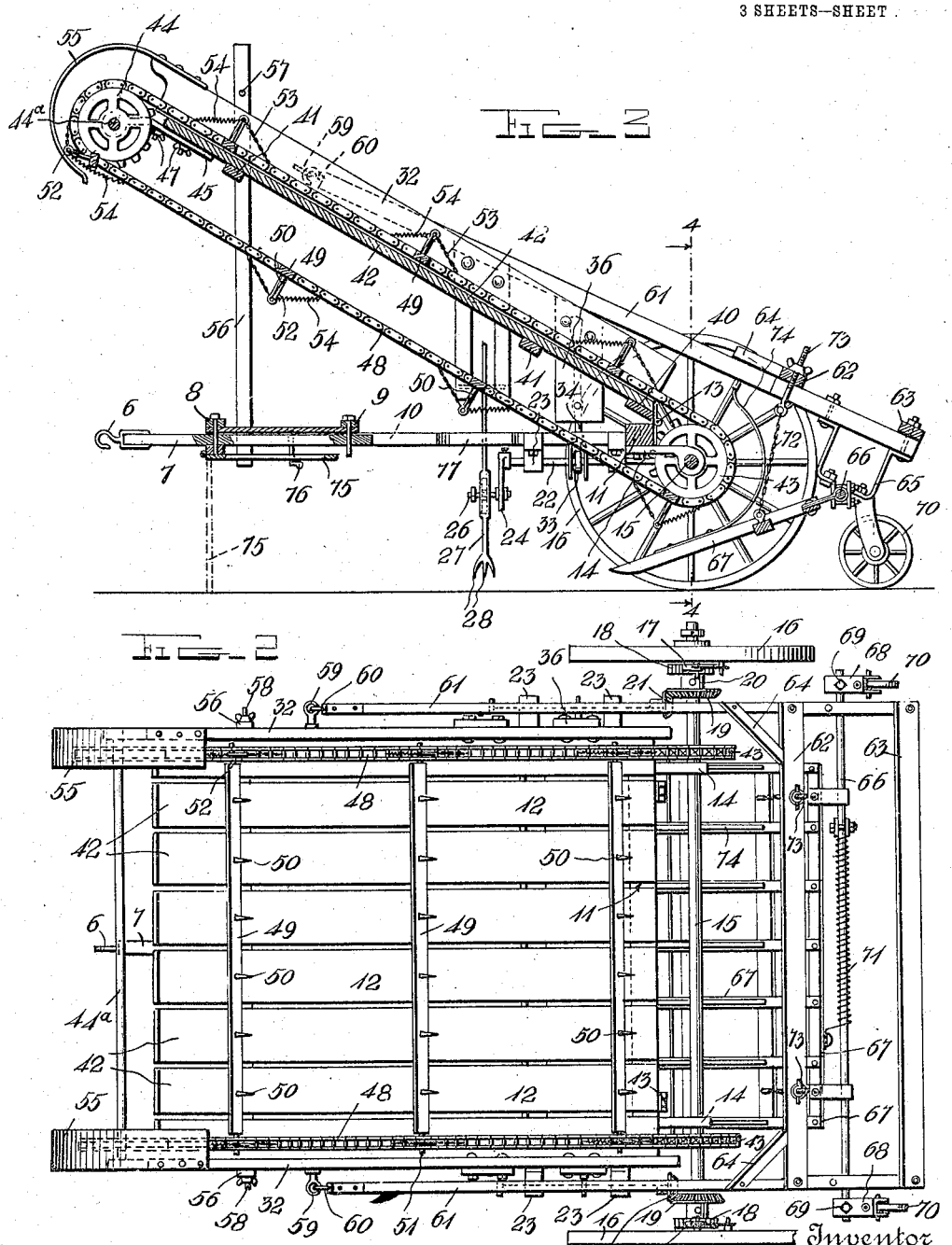

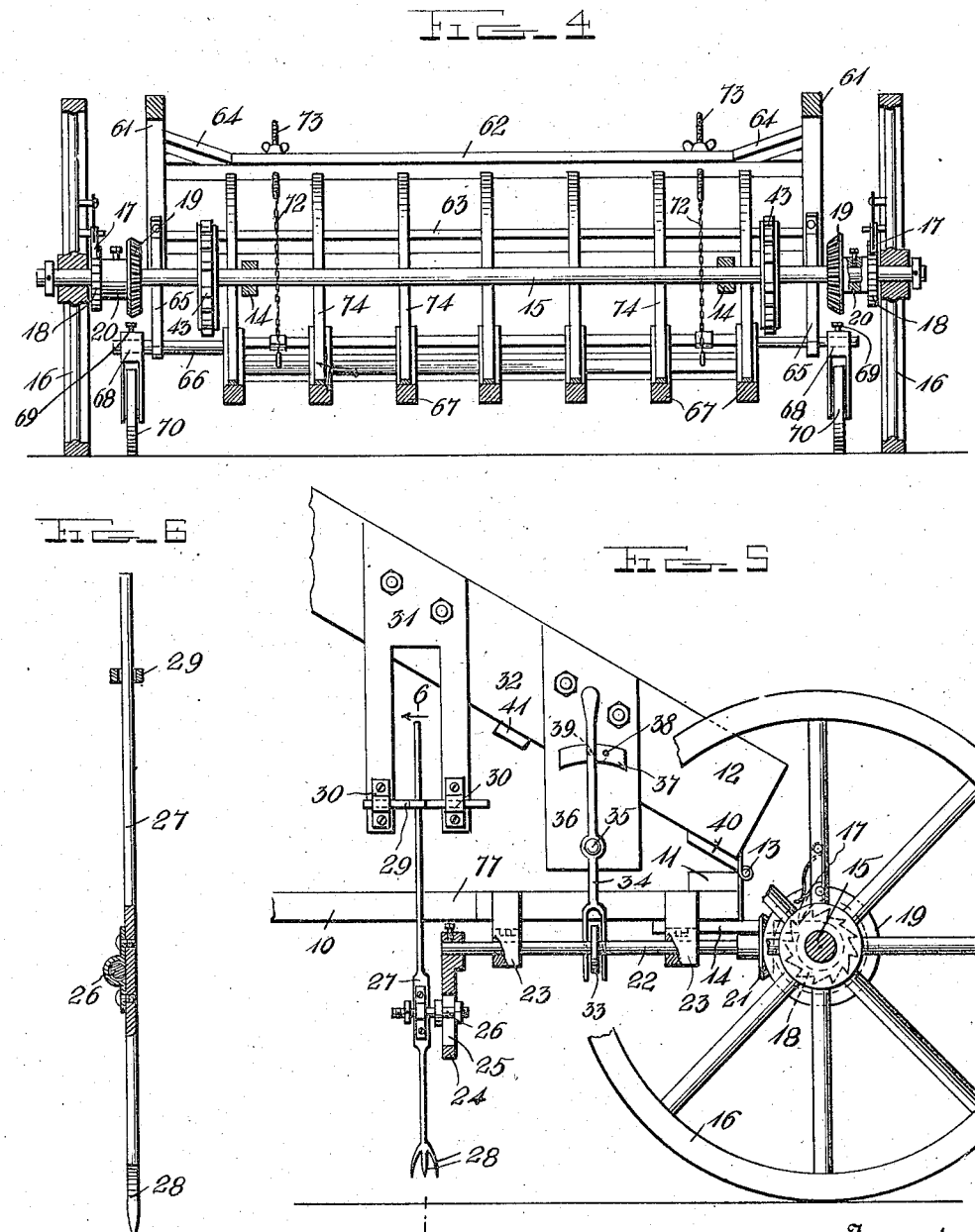

ically automatic in its
UNITED STATES PATENT OFFICE.

CHARLES H. KNAPP, OF CHICAGO, ILLINOIS.

COMBINED HAY RAKE AND ELEVATOR.

No. 900,287.

Specification of Letters Patent.

Patented Oct. 6, 1908.

Application filed January 6, 1908. Serial No. 409,509.

*To all whom it may concern:*

Be it known that I, CHARLES H. KNAPP, a citizen of the United States, residing at Chicago, in the county of Cook and State of Illinois, have invented certain new and useful Improvements in a Combined Hay Rake and Elevator; and I do declare the following to be a full, clear, and exact description of the invention, such as will enable others skilled in the art to which it appertains to make and use the same.

My invention relates to combined hay rakes and elevators.

The object of the invention is to provide a device of this character which will pick up the hay in clean rows and elevate it to a point where it may be received by the hay rack or a wagon body.

A further object of the invention is the provision of means used in connection with the elevator which provides for a positive discharge of the bunches of hay at a point approximately over the wagon body or hay rack.

Heretofore in devices of this character, the elevator has been so constructed that bunches of hay were frequently carried back to the rake end and often clogged the apparatus to such an extent that it was necessary to use force to clear the parts, and it is the object of my invention to avoid these difficulties and to provide a device which will be efficient in operation and practically action.

Further objects will appear as the specific description is read in connection with the accompanying drawings which form a part of this specification, and in which, Figure 1 is a side elevation; Fig. 2 is a top plan view; Fig. 3 is a vertical longitudinal sectional view; Fig. 4 is a cross sectional view taken on the line 4—4 of Fig. 3; Fig. 5 is a fragmentary side elevation of the machine partly in section and showing particularly the fork mechanism; Fig. 6 is a detail section on line 6—6 of Fig. 5; Fig. 7 is a fragmentary view of the releasing mechanism in top plan; and Fig. 8 is a sectional view taken on line 8—8 of Fig. 7.

Referring more especially to the drawings, 1, 2 and 3, respectively, represent the axle, the wheel and the body, of the wagon or hay rack, which is provided with the usual reach, 4, extending rearwardly of the axle and provided with a hook, 5, adapted to be engaged by a similar hook, 6, carried by the tongue, 7, of the elevator. This tongue is bolted to a pair of transverse members, 8 and 9, which extend across and connect the side members, 10, of the elevator. These side members extend rearwardly and are connected by a cross beam, 11, to which is hinged the elevator table, 12, by hinges, 13.

Projecting rearwardly from the cross beam, 11, is a pair of supporting arms, 14, in which is journaled the supporting axle, 15, carrying upon its outer end the traction wheels, 16. These wheels are loosely mounted upon the axle and are provided with pawls, 17, spring pressed into engagement with ratchet wheels, 18, keyed to the shaft and connected with a bevel pinion, 19, by a collar, 20. Each one of the gears 19 meshes with a pinion, 21, which is carried by a longitudinal shaft, 22, journaled in lugs, 23, which depend from the side members, 10. At the outer end of this shaft 22 I provide a crank arm, 24, having a slot, 25, to adjustably accommodate a stub shaft, 26. Journaled upon the stub shaft is a fork, 27, having its lower end provided with a plurality of tines, 28, and its upper end slidably mounted in a guiding member, 29, adjustably journaled in bearings, 30, carried by the forked supporting bracket, which is in turn supported upon the side members, 32, of the conveyer table, 12.

Between the lugs 23 I provide a disk, 33, rigidly keyed to the shaft, and extending upon either side of the disk are the legs of a forked lever, 34, pivoted at 35 to a supporting member, 36, also carried by the side members, 32. I have shown a plate, 37, secured to the supporting member provided with holes, 38, for the reception of an adjusting stud, 39, carried by the upper part of the lever so that the shaft, 22, may be held in adjusted position with its pinion, 21, out of engagement with the gear, 19. When the pinion 21 is thrown out of engagement with the gear, 19, the shaft and fork move forward and carry with them the guiding member 29, which slides longitudinally in the bearings, 30.

The elevator or conveyer comprises the side members, 32, which are connected at their lower ends by a cross slat, 40, to which the hinges, 13, are connected. Several cross slats, 41, are bridged across from side piece to side piece, and lying thereupon are longitudinal slats, 42, which form the bed of the conveyer and provide a support for the material as it passes from the receiving end to the discharge end.

Keyed to the shaft, 15, adjacent either end thereof, is a pair of sprocket wheels, 43, which act in conjunction with a similar pair of sprocket wheels, 44, adjustably carried upon the bracket supports, 45, secured to the outer ends of the slats, 42. These bracket supports are slotted at 46, and provided with a pair of bolts having thumb nuts, 47, so that the tension of the conveyer chains, 48, may be regulated.

At intervals throughout the length of the chains I provide cross slats, 49, which have projecting from their upper faces, tines or grasping pins, 50, adapted to enter the bunches of hay so that the conveyer secures a good grip thereupon. Each end of the slats is provided with a stub shaft, 51, which projects through an aperture in a link of the chain, 48, and has projecting from its upper surface an arm, 52, which is connected on one side to a rivet of the chain by a chain, 43, and on the opposite side to a rivet of the chain by a tension spring, 54.

Carried at the end of the side members, 32, and overhanging the chain, 48, and the sprocket wheels, 44, is a pair of semi-circular guide arms, 55, which engage with the upper portion of the arms, 52, as they pass thereunder and bend them down against the tension of the spring, 54, so as to allow the chain 53 to slacken and the pins 50 to turn backwards, as shown in Fig. 3. When the arms 52, is released from the guiding arm, 55, the slats, 49, are snapped violently by the action of the spring to their normal position, thus throwing any hay which may have become stuck to the tines, 50, into the receptacle, 3.

The conveyer is adjusted vertically in any suitable manner, but I have here shown a simple device which comprises a pair of vertical rods, 56, pivoted to the side members, 10, and provided with a plurality of apertures, 57, adapted to be engaged by a clamping bolt, 58, carried by the side members, 32. To the sides, 32, of the conveyer I secure a pair of eyes, 59, which are engaged by hooks, 60, carried at the ends of the rearwardly extending bars, 61, of the rake frame. The rake frame comprises the bars, 61, which are connected at their rear ends by transverse beams, 62 and 63, and are braced by diagonals, 64. Depending from the side members are U-shaped axle brackets, 65, in which is secured the axle, 66, carrying the forwardly projecting rake, 67, intermediate the bars, 61, and at its ends the wheel blocks, 68. These wheel blocks, 68, are keyed to the axle by set screws, 69, and have pivoted to their rear ends the caster wheels, 70, so that the frame will swing easily with the elevator. The rake is normally held with the tines thereof projecting downwardly by a spiral spring, 71, which is secured at one end to the axle, 66, and at the other end to the rake, 67. The tines of the rake are adjusted against the tension of the spring by a pair of chains, 72, which are connected to screw bolts, 73, carried by the cross beam, 62. Extending from each tine of the rake, 67, are spring fingers, 74, which conform in shape to the outline of the sprockets, 43, and are arranged to receive the hay as it is picked up by the tines, and to hold it in position to be grasped by the points, 50, on the slats, 49.

It will be seen that the entire rake mechanism is independent of the conveyer mechanism and that the conveyer mechanism may be disengaged from the wagon or hay rack at any desired time. To support the conveyer in its proper position when disengaged from the wagon or hay rack, I provide a supporting frame, 75, which is hinged to the forward end of the side members, 10, and is held up out of engagement with the ground by a locking hook, 76.

In operation the rack and conveyer are pulled along behind the wagon or rack and the pawls on the wheel engage the ratchets 18, and operate the shafts, 22, through the gear and pinion, 19 and 21. This gives a rotary motion to the crank arm, 24, and practically a rotary motion to the tines, 28, of the fork, 27. As the forks on opposite sides travel in opposite directions, it will be seen that the hay is picked up and thrown into the path of the rake tines, where it is received and rides up thereupon by the forward motion of the machine. It is then engaged by the tines, 50, on the cross slats, 49, and carried up to the dumping point. If any hay catches in the slats it is snapped off or thrown violently away from the conveyer by the action of the springs 54. As the upper end of the fork 27 describes a rather peculiar motion, I cut away the side members as shown at 77, to accommodate this.

Having thus described my invention, what I claim as new and desire to secure by Letters-Patent, is:

1. In a device of the class described, the combination with a wheeled vehicle, of a conveyer secured thereto, a rake detachably secured to the conveyer, means to direct the material to be received by the rake in the path thereof, and means carried by the rake for holding the material into engagement with the conveyer.

2. In a device of the class described, the combination with a wheeled vehicle, of a conveyer detachably secured thereto, a rake mechanism detachably secured to the conveyer, means for directing the material to be received by the rake in the path thereof, means carried by the rake for holding the material into engagement with the conveyer, and means for positively disengaging the material from the conveyer at the dumping point.

3. In a device of the class described, the combination with a wheeled vehicle, a conveyer secured thereto, a rake detachably secured to the conveyer, a pair of forks operated in the travel of the conveyer for throwing the material to be received by the rake into the path thereof, a series of spring arms carried by the rake for holding the material into engagement with the conveyer, and means for adjusting the conveyer independently of the rake to accommodate the material in the vehicle.

In testimony whereof I have hereunto set my hand in presence of two subscribing witnesses.

CHARLES H. KNAPP.

Witnesses:
 CHAS. L. LOWE,
 MARY COSTIGAN.